United States Patent
Yomoyama

(10) Patent No.: US 11,041,776 B2
(45) Date of Patent: Jun. 22, 2021

(54) PRESSURE DETECTION DEVICE

(71) Applicants: CITIZEN FINEDEVICE CO., LTD., Yamanashi (JP); CITIZEN HOLDINGS CO., LTD., Nishitokyo (JP)

(72) Inventor: Masanori Yomoyama, Yamanashi (JP)

(73) Assignees: CITIZEN FINEDEVICE CO., LTD., Minamitsuru-gun (JP); CITIZEN WATCH CO., LTD., Nishitokyo (JP)

( * ) Notice: Subject to any disclaimer, the term of this patent is extended or adjusted under 35 U.S.C. 154(b) by 372 days.

(21) Appl. No.: 15/129,642

(22) PCT Filed: Mar. 25, 2015

(86) PCT No.: PCT/JP2015/059135
§ 371 (c)(1),
(2) Date: Sep. 27, 2016

(87) PCT Pub. No.: WO2015/147059
PCT Pub. Date: Oct. 1, 2015

(65) Prior Publication Data
US 2017/0153161 A1 Jun. 1, 2017

(30) Foreign Application Priority Data

Mar. 27, 2014 (JP) .............................. JP2014-067064

(51) Int. Cl.
*G01L 23/22* (2006.01)
*G01L 23/10* (2006.01)

(52) U.S. Cl.
CPC ............ *G01L 23/222* (2013.01); *G01L 23/10* (2013.01); *G01L 23/225* (2013.01)

(58) Field of Classification Search
CPC ... H03K 5/1252; H04L 25/0292; G01L 23/10; G01L 23/222; G01L 23/225
See application file for complete search history.

(56) References Cited

U.S. PATENT DOCUMENTS 4,821,194 A * 4/1989 Kawamura ............... F02P 11/06
123/406.16
6,037,824 A * 3/2000 Takahashi ............ H03K 5/1252
327/100

(Continued)

FOREIGN PATENT DOCUMENTS

JP    2002-296332 A    10/2002
JP     2003-4573 A     1/2003

OTHER PUBLICATIONS

Buffer amplifier, Wikipedia, Dec. 23, 2012 (Year: 2012).*

(Continued)

*Primary Examiner* — Kyle R Quigley
(74) *Attorney, Agent, or Firm* — Birch, Stewart, Kolasch & Birch, LLP

(57) ABSTRACT

There is provided a pressure detection device including: a pressure detection element which receives pressure so as to output a detection signal corresponding to the pressure P; and a processing circuit which processes and outputs the detection signal output from the pressure detection element, where the processing circuit includes: a voltage transformation circuit which only transforms a power supply voltage fed from an external power supply so as to obtain a first reference voltage with a predetermined voltage value; an integrator circuit which uses the first reference voltage as an operation reference to perform integral processing on the detection signal so as to convert the detection signal into a voltage waveform; and at least one or more amplifier circuits which use a second reference voltage with a predetermined voltage value as an operation reference to perform amplification processing on an output signal from the integrator circuit.

8 Claims, 6 Drawing Sheets

(56) References Cited

U.S. PATENT DOCUMENTS

| | | | | |
|---|---|---|---|---|
| 6,081,106 | A * | 6/2000 | Camerlo | G05F 1/56 |
| | | | | 323/280 |
| 2009/0118981 | A1* | 5/2009 | Kondo | F02M 47/027 |
| | | | | 701/104 |
| 2012/0060595 | A1* | 3/2012 | Guwang | F02D 35/023 |
| | | | | 73/114.18 |

OTHER PUBLICATIONS

Regulated power supply, Wikipedia, Mar. 5, 2011 (Year: 2011).*
Voltage divider, Wikipedia, Jan. 1, 2004 (Year: 2004).*
Common-mode rejection ratio—Wikipedia, the free encyclopedia, Oct. 12, 2011 (Year: 2011).*
Differential amplifier—Wikipedia, the free encyclopedia, May 11, 2013 (Year: 2013).*
Fred Forssell, A Short Discussion on Summing Busses and Summing Amplifiers, Forssell Technologies, 2001 (Year: 2001).*
International Search Report, issued in PCT/JP2015/059135 (PCT/ISA/210), dated Apr. 21, 2015.

* cited by examiner

PRESSURE DETECTION DEVICE

TECHNICAL FIELD

The present invention relates to a pressure detection device which is suitably used when pressure such as the combustion pressure of an engine is detected.

BACKGROUND ART

In general, various detection devices are proposed which detect physical quantity such as pressure and magnetism and convert them into electrical signals. Since in such a detection device, a sensor outputs a variation in the physical amount as a differential value, the detection device includes a processing circuit for converting, by integration with an integrator circuit, a detection signal from the sensor into the voltage of a waveform similar to the variation in the physical amount.

FIG. 9 shows an example of a processing circuit in a pressure detection device which detects, as a physical amount, the combustion pressure of an engine. The processing circuit 100 shown in FIG. 9 is formed with two operational amplifiers 104 and 110 which are an integrator circuit that integrates a detection signal and an amplifier circuit that amplifies an output signal obtained by the integration with the integrator circuit. One terminal of a piezoelectric element 101 which detects pressure is connected through a conductive member 102 and a capacitor 103 of the processing circuit 100 to the inverting input terminal of the operational amplifier 104, and the other terminal of the piezoelectric element 101 is connected through the conductive member 102 to the GND of the processing circuit 100. In this way, a charge signal Qi from the piezoelectric element 101 is fed to the inverting input terminal of the operational amplifier 104.

On the other hand, a reference voltage Vr from a reference power supply 105 formed with a regulator is fed to the non-inverting input terminal of the operational amplifier 104. A power supply voltage Vdd fed from the outside is stabilized, and thus the reference power supply 105 is output as the reference voltage Vr. Between the inverting input terminal of the operational amplifier 104 and the output terminal of the operational amplifier 104, a charge capacitor 106 and a discharge resistor 107 are connected. In this way, an output signal Vout01 obtained by integrating the charge signal Qi to convert it into a voltage is obtained from the output terminal of the operational amplifier 104.

The output signal Vout01 is fed through a capacitor 111 to the non-inverting input terminal of the operational amplifier 110 which is an amplifier circuit. The non-inverting input terminal is connected through a resistor 112 to the reference voltage Vr. The inverting input terminal of the operational amplifier 110 is connected through a resistor 113 to the reference voltage Vr and is connected through a resistor 114 to the output terminal. In this way, it is possible to obtain an amplified output signal Vout02 from the output terminal of the operational amplifier 110.

On the other hand, the piezoelectric element 101 is stored in the enclosure 120 of the detection device, and the enclosure 120 is grounded (earth) in common with the engine (not shown) when a combustion pressure sensor for detecting the combustion pressure of the engine is used.

The basic operation of the pressure detection device will then be described with reference to FIGS. 10 and 11. With the assumption of an ideal state where the pressure detection device is not affected by external noise, the basic operation of the processing circuit 100 will first be described with reference to FIG. 10. FIG. 10(a) schematically shows the differentiated waveform of the charge signal Qi when the piezoelectric element 101 detects a variation in the combustion pressure at a period T0. The charge signal Qi is fed through the capacitor 103 shown in FIG. 9 to the inverting input terminal of the operational amplifier 104 in the processing circuit 100. FIG. 10(b) shows an example of the voltage waveform of the output signal Vout01 obtained from the output terminal of the operational amplifier 104. Since the operational amplifier 104 is operated with reference to the reference voltage Vr, the charge signal Qi is converted into voltage by integration, and the output signal Vout01 similar to a variation in the pressure is obtained from the output terminal of the operational amplifier 104. FIG. 10(c) shows an example of the voltage waveform of the output signal Vout02 output from the output terminal of the operational amplifier 110. Here, the operational amplifier 110 is operated as a non-inverting amplifier circuit which uses the reference voltage Vr as an operation reference, and the output signal Vout02 thereof is in phase with the output signal Vout01 which is input and the amplitude thereof has a magnitude which is amplified at a predetermined amplification factor.

An example of the operation of the processing circuit 100 when the influence of external noise is received will then be described with reference to FIG. 11. FIG. 11(a) schematically shows, as with FIG. 10(a) described above, the differentiated waveform of the charge signal Qi when the piezoelectric element 101 detects a variation in the combustion pressure at the period T0. However, in the case of FIG. 11(a), influences such as radiation noise produced from the engine (not shown) to which the pressure detection device is fitted and electromagnetic induction noise from the conductive member 102 which connects the piezoelectric element 101 and the processing circuit 100 are received, and thus the charge signal Qi on which a noise component Ni which has various frequency components is superimposed is shown. FIG. 11(b) schematically shows an example of the voltage waveform of the output signal Vout01 output from the operational amplifier 104 when the influence of external noise is received. Although the non-inverting input terminal of the operational amplifier 104 is connected to the reference voltage Vr from the reference power supply 105 as shown in FIG. 9, the reference power supply 105 is a power supply formed with the regulator so as to have a characteristic in which the reference power supply 105 generates a stable direct-current voltage and is unlikely to be affected by external noise. Hence, the reference voltage Vr fed to the non-inverting input terminal of the operational amplifier 104 is stable in terms of both direct current and alternating current, and thus the reference voltage Vr is minimally affected by electrical noise from the outside. Thus, the charge signal Qi containing the noise component Ni is fed to the inverting input terminal of the operational amplifier 104 whereas the stable reference voltage Vr containing almost no noise component is fed to the non-inverting input terminal. Consequently, the operational amplifier 104 amplifies a differential signal between the inverting input terminal and the non-inverting input terminal, and the output signal obtained by integrating the charge signal Qi to convert it into a voltage becomes the output signal Vout01 in which a noise component N01 obtained by amplifying the noise component Ni contained in the charge signal Qi is superimposed. FIG. 11(c) schematically shows an example of the voltage waveform of the output signal Vout02 obtained from the output terminal of the operational amplifier 110. Since the operational amplifier 110 amplifies the output signal Vout01 containing the noise component N01, the output signal Vout02 is an output which contains a noise component N02 obtained by amplifying the noise component N01. Hence, the output signal Vout02 is, so to speak, a signal which is embedded in the noise component N02.

As described above, disadvantageously, when a noise component enters the charge signal Qi serving as the detection signal in a mixed manner, the processing circuit 100 in the pressure detection device also amplifies such a noise component, and thus an S/N ratio in the output signal is degraded, and the accuracy of the detection is significantly lowered. As a method of removing the noise component N02 in the output signal Vout02, providing a filter circuit in a stage subsequent to the processing circuit 100 can be considered, attenuating only the noise component N02 with this filter circuit and thereby enhancing the S/N ratio, but since external noise generally contains various frequency components, it is not easy to remove it with a filter circuit. In particular, when the frequency components of the charge signal Qi are close to the noise component, it is difficult to remove it with the filter circuit since it is impossible to attenuate only the noise component.

Hence, conventionally, in terms of signal processing, a method of reducing the influence of noise entering the detection signal of a sensor in a mixed manner is proposed, and for example, patent literature 1 discloses the following signal processing method. In the signal processing method, a noise component is added to and subtracted from the output signal of an integrator circuit in the initial stage through a voltage dividing resistor, and is input to an amplifier circuit in the subsequent stage, the output signal of the amplifier circuit is AD-converted so as to be monitored with a computer, an attenuator is controlled and adjusted in a way that the noise component is minimized and thus electromagnetic induction noise entering the detection signal in a mixed manner is removed, that is, a noise component from a magnetic sensor for detecting, as a physical amount, a variation in magnetism, is reduced.

CITATION LIST

Patent Literature

JP-No. 2002-296332

SUMMARY OF INVENTION

Technical Problem

However, in the signal processing method for removing noise disclosed in patent literature 1, the following problems are present.

Specifically, since patent literature 1 discloses the processing method of adding and subtracting the noise component to and from the signal, it is possible that there is a substantial error in the noise removal, with the result that it is not easy to obtain a highly accurate detection signal. In particular, in the extraction of the noise component, since a noise level is determined from the detection signal of a sensor on standby, there is no problem in a state where noise is stable but it is difficult to utilize the method for the pressure detection device which detects the combustion pressure of an engine or the like where the magnitude of noise, the frequency component and the like are varied in real time. Moreover, since the method is used of monitoring the output signal of the amplifier circuit with a computer, a large-scale detection device is needed. Consequently, the size of the system is easily increased, complications in its operation easily occur, costs related to manufacturing are easily increased and complications in maintenance easily occur.

The objective of the present invention is to provide a pressure detection device which solves the forgoing problems present in the background technology.

Solution to Problem

In order to solve the foregoing problems, according to the present invention, there is provided a pressure detection device 10 which includes: a pressure detection element ($21a$, $21b$, $21c$) which receives pressure P so as to output a detection signal Qi corresponding to the pressure P; and a processing circuit 30 which processes and outputs the detection signal Qi output from the pressure detection element 21, where the processing circuit 30 includes: a voltage transformation circuit 35 which only transforms the power supply voltage Vdd fed from an external power supply so as to obtain a first reference voltage Vr1 with a predetermined voltage value; an integrator circuit 31 which uses the first reference voltage Vr1 as an operation reference to perform integral processing on the detection signal Qi so as to convert the detection signal Qi into a voltage waveform; and at least one or more amplifier circuits 32 which use a second reference voltage Vr2 which has a predetermined voltage value as an operation reference to perform amplification processing on an output signal Vout1 from the integrator circuit 31.

In this case, according to a preferred aspect of the invention, the voltage transformation circuit 35 is preferably formed with a voltage dividing resistor circuit in which a plurality of voltage dividing resistors R1 and R2 are combined. Preferably, the integrator circuit 31 is operated with a single power supply and is formed with a computation amplifier circuit which differentially amplifies the detection signal Qi and the first reference voltage Vr1. On one hand, the second reference voltage Vr2 can be obtained from an output of a second reference power supply 34 using a regulator which stabilizes the power supply voltage Vdd. The second reference voltage Vr2 can also be obtained from the voltage transformation circuit 35. On the other hand, the processing circuit 30 can include a voltage follower circuit in a final stage. At least part of the processing circuit 30 can be formed with the integrator circuit, and at that time, the voltage transformation circuit 35 may be arranged outside the integrator circuit or incorporated in the integrator circuit. Furthermore, as the detection signal Qi, a charge signal (Qi) which is obtained from a piezoelectric element 21 used as the pressure detection element can be used. The pressure detection device 10 is preferably used when the combustion pressure P of an engine 1 mounted on an automobile is detected.

Advantageous Effects of Invention

In the pressure detection device 10 configured as described above and according to the present invention, the following remarkable effects are provided.

(1) Since the processing circuit 30 includes the voltage transformation circuit 35 which only transforms the power supply voltage Vdd fed from an external power supply so as to obtain the first reference voltage Vr1 with a predetermined voltage value, the integrator circuit 31 which uses the first reference voltage Vr1 as the operation reference to perform integral processing on the detection signal Qi so as to convert the detection signal Qi into a voltage waveform, and at least one or more amplifier circuits 32 which use the second reference voltage Vr2 with a predetermined voltage value as the operation reference to perform amplification processing on the output signal Vout1 from the integrator circuit 31, the noise component caused by a disturbance is simultaneously superimposed both on the first reference voltage Vr1 and the detection signal Qi. Hence, in the configuration in which the noise components cancel each other out, it is possible to reduce the noise component which is superimposed on the necessary signal, and thus it is possible to realize highly accurate pressure detection. Moreover, since a complicated digital device such as a computer is not needed for noise removal, it is possible to perform the operation at a low cost, and it is also possible to facilitate maintenance and to further reduce the size and weight.

(2) In a preferred aspect, the voltage transformation circuit 35 is formed with the voltage dividing resistor circuit in which a plurality of voltage dividing resistors R1 and R2 are combined, and thus it is possible to perform the operation with a simple circuit configuration and to prevent a stabilization circuit such as a regulator from being needed, with the result that it is possible to more easily perform the operation at a lower cost.

(3) In a preferred aspect, when the integrator circuit 31 is formed with a computation amplifier circuit which is operated with a single power supply and which differentially amplifies the detection signal Qi and the first reference voltage Vr1, an instantaneously generated waveform, a noise component which is varied as necessary and the like are dynamically cancelled out by capturing variations in the noise component in real time, with the result that it is possible to maintain high detection accuracy and to obtain a highly effective noise reduction effect. Consequently, it is possible to perform integral processing on the detection signal Qi without being affected by the noise component and to realize the integrator circuit easily and inexpensively using a relatively simple circuit.

(4) In a preferred aspect, the second reference voltage Vr2 is obtained from the output of the second reference power supply 34 using the regulator for stabilizing the power supply voltage Vdd, and thus the operation of the amplifier circuit can be stabilized, with the result that it is possible to obtain a stable output signal with a few variations in the voltage level. In other words, since amplification processing can be performed on the output signal in which the noise component is reduced in the preceding stage, it is possible to perform the amplification processing without being affected by the noise component.

(5) In a preferred aspect, the second reference voltage Vr2 is obtained from the voltage transformation circuit 35, and thus the use of the voltage transformation circuit 35 for different purposes and the unnecessity of the regulator are facilitated, with the result that the cost can be further reduced by the simplification of the power supply system. Although here, the influence of the noise component is easily received, since the output signal in the preceding stage contains almost no noise component, it is possible to configure the pressure detection device 10 so that the influence of the noise is low when compared with a conventional one.

(6) In a preferred aspect, the voltage follower circuit is provided in the final stage of the processing circuit 30, and thus in the output in the final stage, the impedance can be lowered, with the result that it is possible to avoid a failure in which the noise component is superimposed on the output signal in the final stage.

(7) In a preferred aspect, when at least part of the processing circuit 30 is formed with an integrator circuit, the voltage transformation circuit 35 may be arranged outside the integrator circuit or incorporated in the integrated circuit. In other words, since the noise reduction effect can be ensured in whichever state the processing circuit 30 is in, even in a limited arrangement space, the design flexibility on the assembly can be enhanced. In particular, since, in the case where the integrated circuit is incorporated, the number of components can be reduced, it is possible to enhance the reliability of the pressure detection device 10. Variations in the ratio between the resistance values of the internal resistors are decreased, and thus it is possible to reduce variations in the voltage value of the first reference voltage.

REFERENCE SIGNS LIST

1: engine, 10: pressure detection device, 21: pressure detection element (piezoelectric element), 21a: pressure detection element (piezoelectric element), 21b: pressure detection element (piezoelectric element), 21c: pressure detection element (piezoelectric element), 30: processing circuit, 31: integrator circuit, 32: amplifier circuit, 34: second reference power supply, 35: voltage transformation circuit (voltage dividing resistor circuit), P: pressure (combustion pressure), Qi: detection signal (charge signal), Vdd: power supply voltage, Vr1: first reference voltage, Vr2: second reference voltage, Vout1: output signal, R1: voltage dividing resistor, R2: voltage dividing resistor

DESCRIPTION OF EMBODIMENTS

Preferred embodiments according to the present invention will then be described in detail with reference to drawings.

First, in order for a pressure detection device according to the present invention to be easily understood, the schematic configuration of an engine to which the pressure detection device is fitted will be described with reference to FIG. 1.

Figure 1:
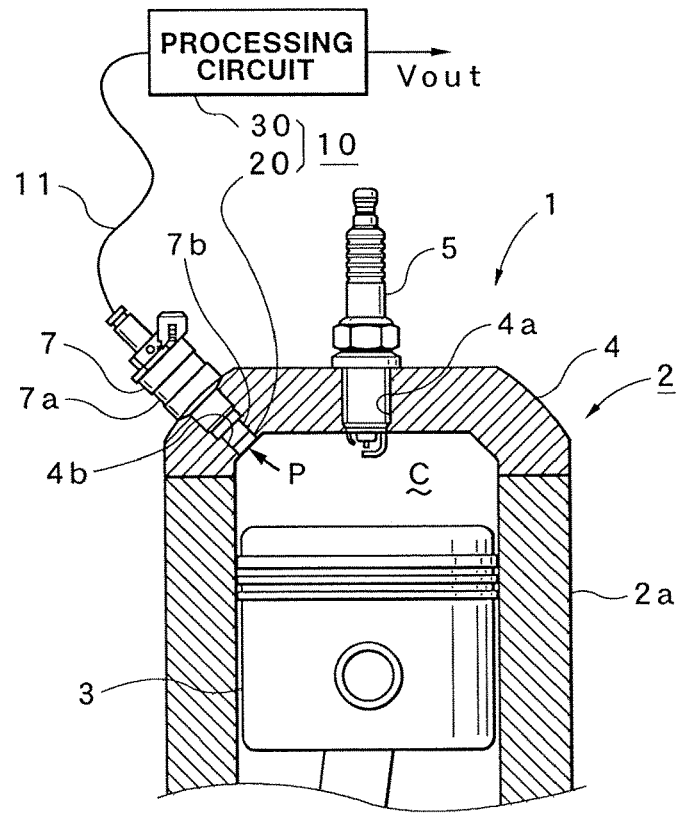
FIG. 1 is a schematic configuration diagram showing an engine to which a pressure detection device according to the preferred embodiment of the present invention is fitted.

In FIG. 1, symbol 1 represents an automobile engine to which the pressure detection device 10 is fitted. The engine 1 includes a cylinder block 2 which has a cylinder 2a, a piston 3 which reciprocates within the cylinder 2a and a cylinder head 4 which is coupled to the cylinder block 2 to form a combustion chamber C together with the cylinder 2a, the piston 3 and the like. The engine 1 also includes a spark plug 5 which is fitted to the cylinder head 4 to perform ignition for detonating an air-fuel mixture within the combustion chamber C and a fuel injection device 7 which is fitted to the cylinder head 4 to inject fuel into the combustion chamber C. In this case, two communication holes 4a and 4b which penetrate the cylinder head 4 to allow the combustion chamber C to communicate with the outside are formed, the spark plug 5 is fitted to the one communication hole 4a and the fuel injection device 7 is fitted to the other communication hole 4b. Furthermore, the fuel injection device 7 includes a main body portion 7a which is located outside the combustion chamber C and a cylindrical tip end portion 7b which is integrally provided on a tip end side with respect to the main body portion 7a such that a tip end surface faces the combustion chamber C.

The configuration of the pressure detection device 10 according to the present embodiment will then be described. The basic configuration of the entire pressure detection device 10 will first be described with reference to FIGS. 1 and 2.

As shown in FIG. 1, the pressure detection device 10 includes a detection portion 20 which is provided at the tip end portion 7b of the fuel injection device 7 and a processing circuit 30 which is connected through a conductive portion 11 to the detection portion 20. The detection portion 20 is formed in the shape of a ring and has the function of detecting internal pressure (combustion pressure: arrow P) within the combustion chamber C. As the conductive portion 11, a metal bar or a cable can be used. On the other hand, the processing circuit 30 receives, through the conductive portion 11, a detection signal obtained by the detection portion 20 and performs signal processing to output an output signal Vout. The output signal Vout is fed to an external engine control portion (not shown).

Figure 2:
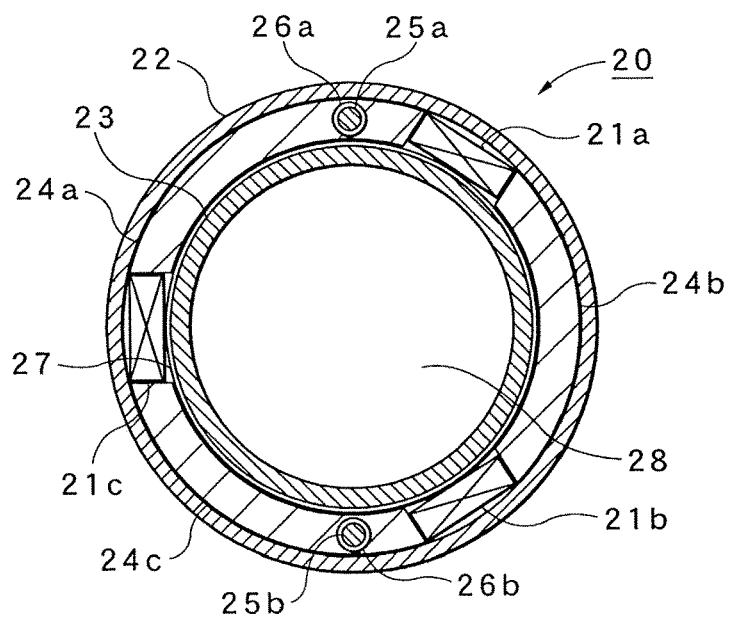
FIG. 2 is a cross-sectional view showing the structure of the detection portion in the pressure detection device.

FIG. 2 shows a cross-sectional view of the vicinity of piezoelectric elements arranged within the detection portion 20 which is taken along the radial direction of the detection portion 20. As shown in FIG. 2, the illustrated detection portion 20 includes three piezoelectric elements 21a, 21b and 21c which form a pressure detection element, and they are arranged substantially at regular intervals along the circumferential direction in a gap between the front outer enclosure 22, which is the conductive enclosure of the detection portion 20 and formed in the shape of a ring, and the front inner enclosure 23. In the following discussion, the description of the piezoelectric element 21 includes three piezoelectric elements 21a, 21b and 21c. When the piezoelectric element 21 is arranged, insulating spacers 24a to 24c are interposed, and the piezoelectric elements 21a, 21b and 21c are arranged in the gaps between the piezoelectric elements 21a, 21b and 21c, at approximately regular intervals along the circumferential direction. In this configuration, the combustion pressure P of the engine 1 can be received by the piezoelectric element 21.

In the spacers 24a and 24c, spacer through holes 26a and 26b for passing connection terminals 25a and 25b through which a detection signal from the piezoelectric element 21 is transmitted to the outside are provided. In this way, the connection terminals 25a and 25b penetrate the spacer through holes 26a and 26b, and are insulted by the spacers 24a and 24c from the front outer enclosure 22 and the front inner enclosure 23. Furthermore, the electrodes of the three piezoelectric elements 21a to 21c are connected in parallel within the detection portion 20, and are electrically connected through the connection terminals 25a and 25b and the conductive portion 11 to the processing circuit 30 (see FIG. 1).

As the material of the spacers 24a to 24c, a ceramic (alumina, zirconia) or the like can be utilized, but the material is not limited as long as it is an insulating material. On the entire outer circumference of the front inner enclosure 23, an annular insulating film 27 is arranged so as to insulate the electrodes (not shown) on the inner side of the piezoelectric element 21 arranged in the circumferential direction from the front inner enclosure 23. As described above, since a plurality of piezoelectric elements 21 are arranged within the detection portion 20 along the circumferential direction at regular intervals, they can receive pressure from the outside in a well-balanced and uniform manner, and thereby can perform highly accurate pressure detection. On the other hand, since a hollow 28 is present within the detection portion 20, the tip end portion 7b of the fuel injection device 7 is arranged in the hollow 28, and thus the fuel is injected into the combustion chamber C (see FIG. 1). Although the detection portion 20 of the present embodiment has three piezoelectric elements 21a to 21c as an example, the number of piezoelectric elements 21 is not limited, and a larger number thereof may be provided. The form in which the detection portion 20 is fitted to the engine 1 is not limited to the form in which the detection portion 20 is attached to the tip end portion 7b of the fuel injection device 7, and although not illustrated, the detection portion 20 of the pressure detection device 10 may be independently fitted to the cylinder head 4.

The configuration of an electrical system in the pressure detection device 10 will then be mainly described using the first and second embodiments with reference to FIGS. 3 to 8.

First Embodiment

The configuration of the pressure detection device 10 according to the first embodiment will first be specifically described with reference to FIGS. 3 to 6.

Figure 3:
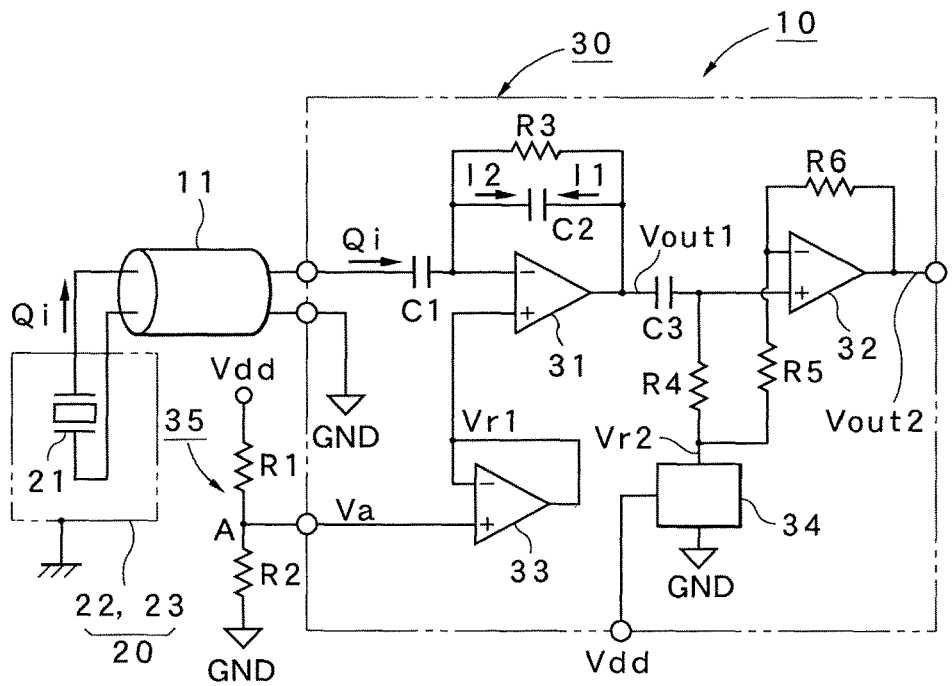
FIG. 3 is a circuit diagram of a pressure detection device according to the first embodiment of the present invention.

As shown in FIG. 3, the pressure detection device 10 includes the detection portion 20 and the processing circuit 30, and as described previously, the detection portion 20 includes a piezoelectric element 21 for detecting the combustion pressure P of the engine 1 (see FIG. 1) and the piezoelectric element 21 is covered with a conductive enclosure (indicated by broken lines) of the front outer enclosure 22 and the front inner enclosure 23. The charge signal Qi which is the detection signal from the piezoelectric element 21 is fed through the conductive portion 11 to the processing circuit 30. In other words, one terminal of the piezoelectric element 21 is connected through the conductive portion 11 to the processing circuit 30, and the other terminal is connected through the conductive portion 11 to the GND of the processing circuit 30. The front outer enclosure 22 and the front inner enclosure 23 of the detection portion 20 are grounded (earth) in common with the engine 1.

The illustrated processing circuit 30 is formed with a one-chip integrated circuit, and includes three operational amplifiers 31, 32 and 33 which are operated with a single power supply (as an example, power supply voltage Vdd=5V) and a second reference power supply 34 formed with a regulator. In this case, the operational amplifier 31 forms an integrator circuit, the operational amplifier 32 forms an amplifier circuit and the operational amplifier 33 forms the first reference power supply of a voltage dividing resistor system. Although the operational amplifiers 31, 32 and 33 are connected to the power supply voltage Vdd and the GND, the wiring thereof is not illustrated. The charge signal Qi is fed to the processing circuit 30 from the piezoelectric element 21, and the charge signal Qi is input through a capacitor C1 to the inverting input terminal of the operational amplifier 31 serving as the integrator circuit. On the other hand, a first reference voltage Vr1 which will be described later is input to the non-inverting input terminal of the operational amplifier 31. Furthermore, between the inverting input terminal and the output terminal of the operational amplifier 31, a charge capacitor C2 and a high-resistance protective resistor R3 are connected. In this way, the integrator circuit which is formed with the operational amplifier 31 using the first reference voltage Vr1 as the operation reference is formed, and an output signal Vout1 obtained by integrating the charge signal Qi to convert it into a voltage is obtained from the output terminal of the operational amplifier 31. Since the protective resistor R3 and the charge capacitor C2 form a high pass filter, as the time constant RC thereof, a value which is sufficiently long as compared with the frequency range of the combustion pressure P to be measured is preferably selected.

As described above, when the integrator circuit 31 is formed with a computation amplifier circuit which is operated with a single power supply and which differentially amplifies the detection signal Qi and the first reference voltage Vr1, instantaneously generated waveforms, noise components which vary from time to time and the like are dynamically cancelled out by capturing variations in the noise component in real time, with the result that it is possible to maintain high detection accuracy and to obtain a highly effective noise reduction effect. Consequently, it is possible to perform integral processing on the detection signal Qi without being affected by the noise component and to realize an integrator circuit with a relatively simple circuit easily and inexpensively.

The output signal Vout1 from the operational amplifier 31 is fed through a capacitor C3 to the non-inverting input terminal of the operational amplifier 32 serving as the amplifier circuit in a stage subsequent to the operational amplifier 31, and a second reference voltage Vr2 from the second reference power supply 34 is further fed through a resistor R4 to the non-inverting input terminal. On the other hand, the inverting input terminal of the operational amplifier 32 is connected through a resistor R5 to the second reference voltage Vr2 and is also connected through a resistor R6 to the output terminal. The second reference power supply 34 is a power supply formed with the regulator, receives the power supply voltage Vdd for driving the processing circuit 30 so as to obtain the stable second reference voltage Vr2, and is supplied to the operational amplifier 32 serving as the amplifier circuit. As described above, the second reference voltage Vr2 is obtained from the output of the second reference power supply 34 using the regulator for stabilizing the power supply voltage Vdd, and thus the operation of the amplifier circuit can be stabilized, with the result that it is possible to obtain a stable output signal with few variations in the voltage level. In other words, since amplification processing can be performed on the output signal in which the noise component is reduced in the preceding stage, it is possible to perform the amplification processing without being affected by the noise component. The illustrated second reference voltage Vr2 is DC 1.0V. In this way, the operational amplifier 32 is operated as a non-inverting amplifier circuit using the second reference voltage Vr2 as the operation reference, and outputs an amplified output signal Vout2 from the output terminal. The amplification factor of the amplifier circuit is determined by the ratio between the resistance values of the resistor R5 and the resistor R6.

On the other hand, outside the processing circuit 30, a voltage transformation circuit 35 is provided. The voltage transformation circuit 35 is formed by arranging two voltage dividing resistors R1 and R2 as a voltage dividing resistor circuit. As described above, the voltage transformation circuit 35 is formed with the voltage dividing resistor circuit in which a plurality of voltage dividing resistors R1 and R2 are combined, and thus it is possible to perform the operation with a simple circuit configuration and to prevent a stabilization circuit such as a regulator from being needed, with the result that it is possible to more easily perform the operation at a lower cost.

In this case, one terminal of the voltage dividing resistor R1 is connected to the power supply voltage Vdd, the other terminal is connected to one terminal of the voltage dividing resistor R2 and the other terminal of the voltage dividing resistor R2 is connected to the GND. In this way, the power supply voltage Vdd is divided by the voltage dividing resistors R1 and R2, and at the connection point A of the voltage dividing resistors R1 and R2, a divided voltage Va obtained by dividing the power supply voltage Vdd is obtained. The divided voltage Va is fed to the processing circuit 30. The divided voltage Va fed to the processing circuit 30 is input to the operational amplifier 33, and the first reference voltage Vr1 is output from the operational amplifier 33. The first reference voltage Vr1 is fed to the non-inverting input terminal of the operational amplifier 31 serving as the integrator circuit. In this case, the inverting input terminal of the operational amplifier 33 is connected to the output terminal, and thus the operational amplifier 33 is operated as a voltage follower circuit and outputs the divided voltage Va as the first reference voltage Vr1 of a low-output impedance. The voltage value of the first reference voltage Vr1 is determined by the ratio between the resistance values of the voltage dividing resistors R1 and R2. The illustrated first reference voltage Vr1 is DC 1.0V. As described above, the voltage dividing resistors R1 and R2 and the operational amplifier 33 form the first reference power supply which outputs the first reference voltage Vr1. When the resistance values of the voltage dividing resistors R1 and R2 are low, since the output impedance of the divided voltage Va is lowered, the operational amplifier 33 may be removed.

In the configuration described above, the charge signal Qi which is input is integrated with the integrator circuit of the operational amplifier 31 using the first reference voltage Vr1 as the operation reference, and the output signal Vout1 is output. Furthermore, the output signal Vout2 which is amplified at a predetermined amplification factor by the amplifier circuit of the operational amplifier 32 using the second reference voltage Vr2 as the operation reference is output. The reason why both the integrator circuit of the operational amplifier 31 and the amplifier circuit of the operational amplifier 32 need the reference voltages is that since the power supply voltage Vdd which drives the processing circuit 30 is a single power supply, an intermediate voltage between the power supply voltage Vdd and the GND is needed as a reference for the operation for the operational amplifier 31 and the operational amplifier 32. The reference voltage is preferably a voltage close to the GND such that the amplitudes (crest values) of the output signals Vout1 and Vout2 are maximized, and specifically, they are preferably about DC 1.0V.

Figure 4:
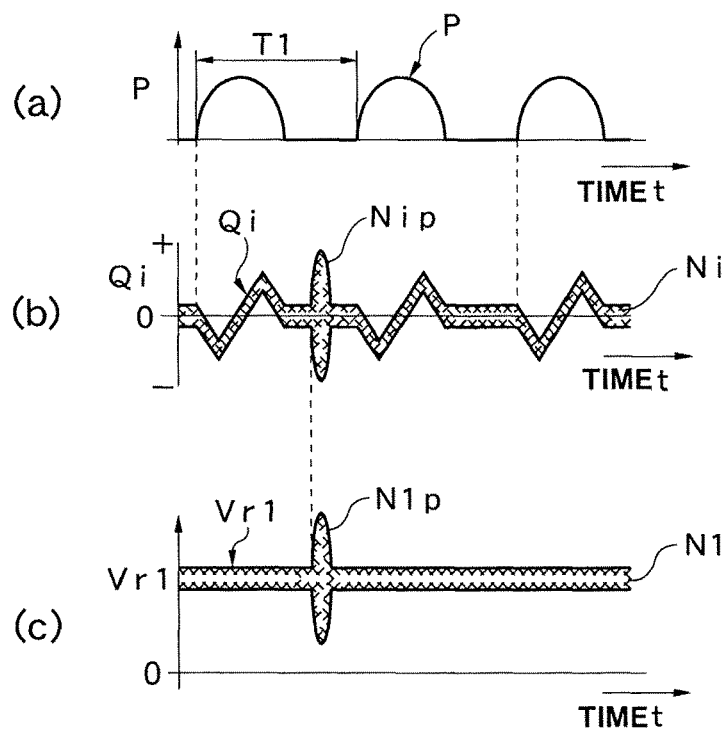
FIG. 4 is a waveform diagram of combustion pressure, a charge signal and the like illustrating the operation of the pressure detection device according to the first embodiment of the present invention.
Figure 5:
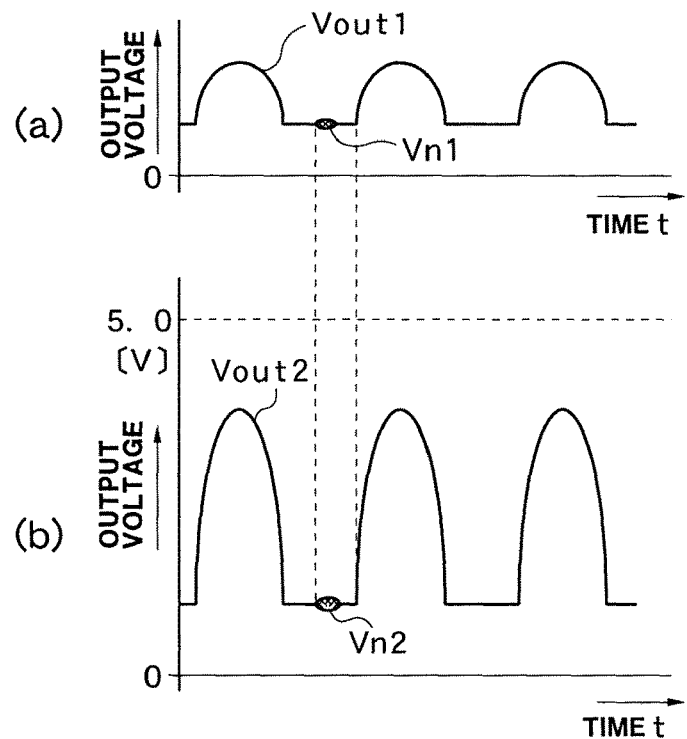
FIG. 5 is a waveform diagram of an output signal illustrating the operation of the pressure detection device according to the first embodiment of the present invention.

The operation of the pressure detection device 10 according to the first embodiment will then be described with reference to FIGS. 3 to 5. FIG. 4(a) schematically shows a relationship between time t and the combustion pressure P which is received by the piezoelectric element 21. As an example, the combustion pressure P is assumed to be repeatedly produced at a period T1. When the pressure detection device 10 is fitted to the engine 1 as shown in FIG. 1, the period T1 of the combustion pressure P is varied according to the number of revolutions of the engine 1. Specifically, as the number of revolutions of the engine 1 increases, the period T1 decreases whereas as the number of revolutions of the engine 1 decreases, the period T1 increases. When the combustion pressure P of the engine 1 incorporated in an automobile or the like is detected with the pressure detection device 10 as described above, as the number of revolutions increases or decreases, the period T1 constantly changes.

FIG. 4(b) schematically shows a relationship between the charge signal Qi which is the output of the piezoelectric element 21 in the detection portion 20 receiving the combustion pressure P and time t. Since the piezoelectric element 21 detects a variation in the combustion pressure P as a differential value, the charge signal Qi is output as a differentiated waveform. In the illustrated case, as the combustion pressure P increases, the charge signal Qi is transferred to the negative side whereas as the combustion pressure P decreases, the charge signal Qi is transferred to the positive side; however, the polarity of the charge signal Qi can also be reversed by changing the connection of the piezoelectric element 21.

Figure 9:
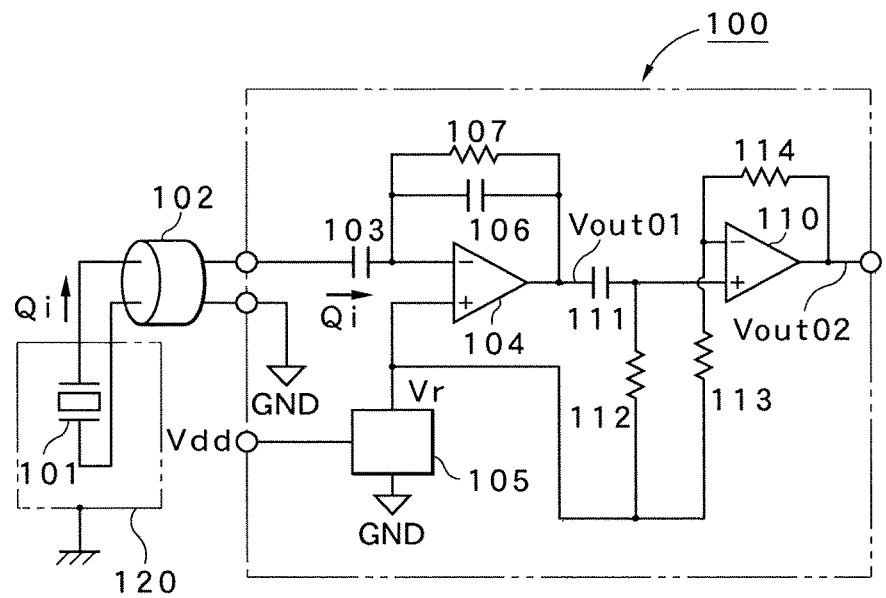
FIG. 9 is a circuit diagram illustrating a processing circuit in a pressure detection device according to background technology.
Figure 10:
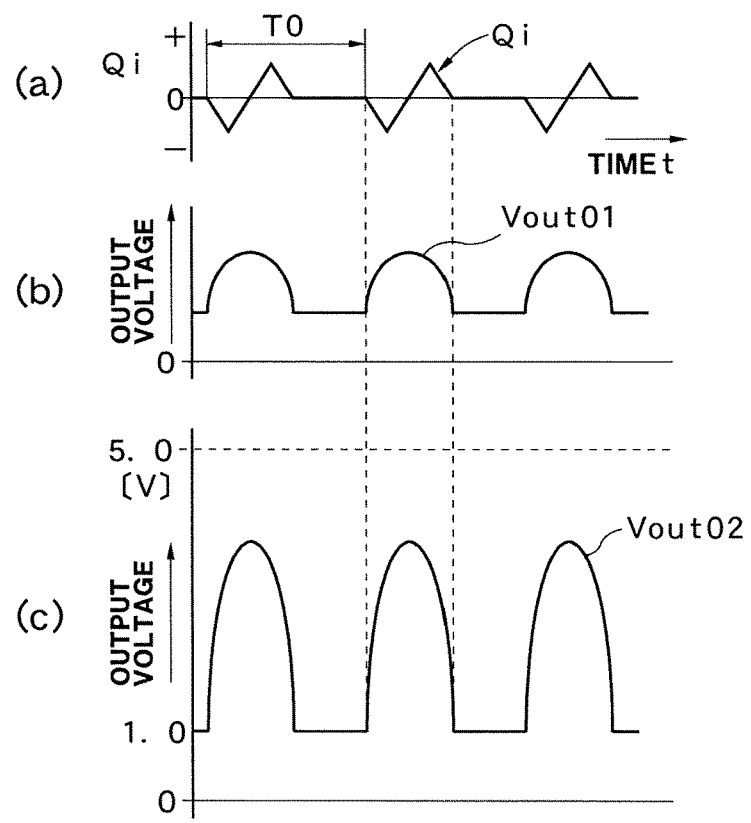
FIG. 10 is a waveform diagram illustrating the basic operation of the processing circuit in the pressure detection device.
Figure 11:
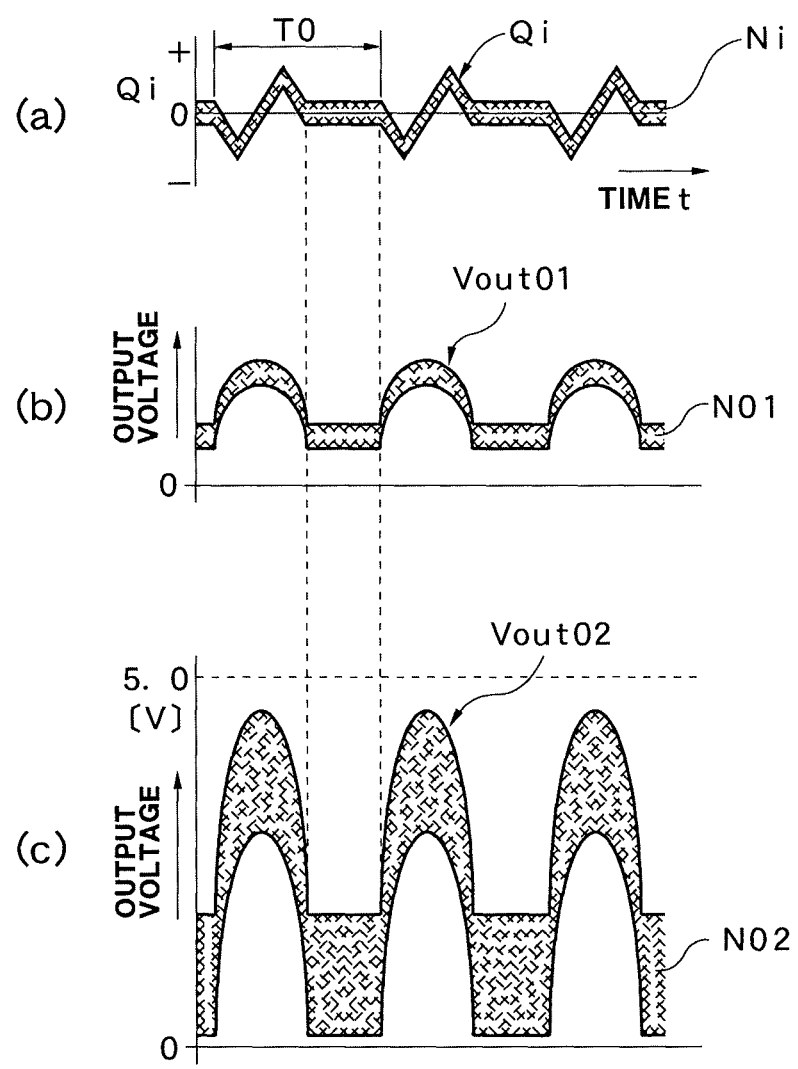
FIG. 11 is a waveform diagram illustrating an operation when a noise component is contained in the detection signal of the pressure detection device.

In this case, as in the case of FIG. 9 described previously, the obtained charge signal Qi receives the influences of radiation noise produced from the engine 1, electromagnetic induction noise placed on the conductive portion 11 connecting the piezoelectric element 21 and the processing circuit 30 and the like, and thereby contains the noise component Ni which has various sizes and frequency components. FIG. 4(b) schematically shows an example of a peak noise component instantaneously produced by some factor as Nip in the noise component Ni. The peak noise component Nip is a large noise component instantaneously produced as compared with the noise component Ni steadily produced. Hence, the charge signal Qi containing such a noise component Ni is fed through the capacitor C1 to the inverting input terminal of the operational amplifier 31 in the processing circuit 30.

FIG. 4(c) schematically shows the first reference voltage Vr1 which is the output of the operational amplifier 33. On the power supply voltage Vdd and the GND in the pressure detection device 10, the radiation noise and the electromagnetic induction noise produced from the engine 1 (see FIG. 1) described previously are placed, and these noises are passed through the voltage dividing resistors R1 and R2, are placed on the divided voltage Va and fed to the operational amplifier 33. In this way, on the first reference voltage Vr1 which is the output of the operational amplifier 33, a noise component N1 containing various frequency components is superimposed. N1p in the noise component N1 schematically shows, and as with the Nip described previously, an example of a peak noise component instantaneously produced by some factor. In other words, both the noise component Ni steadily contained in the charge signal Qi and the peak noise component Nip instantaneously produced are input to the inverting input terminal of the operational amplifier 31, and the noise component N1 steadily contained in the first reference voltage Vr1 and the peak noise component N1p instantaneously produced are input to the non-inverting input terminal of the operational amplifier 31.

In this case, both the noise component Ni contained in the charge signal Qi and the noise component N1 contained in the first reference voltage Vr1 are the radiation noise and the electromagnetic induction noise produced from the engine 1, and the production sources thereof are the same. Hence, when the noise is changed due to factors such as a variation in the number of revolutions of the engine 1, the two noise components Ni and N1 are changed in the same manner. In other words, as the noise component Ni increases in size, the noise component N1 also increases in size, and as the phase and period of the noise component Ni change, the phase and period of the noise component N1 change in the same manner. Consequently, since the same or nearly the same noise components Ni and N1 are input, in real time, to both the inverting input terminal and the non-inverting input terminal of the operational amplifier 31 serving as the integrator circuit, the operational amplifier 31 functioning as a differential amplifier cancels out the noise components Ni and N1, and thereby can integrate the charge signal Qi while being barely affected by the noise. Since the peak noise components Nip and N1p instantaneously produced by some factor are also contained in the noise components Ni and N1 with the same timing, they are almost cancelled out by the operational amplifier 31 functioning as a differential amplifier.

FIG. 5(a) shows the relationship between the output signal Vout1 obtained from the output terminal of the operational amplifier 31 in the processing circuit 30 and time t. In this case, the operational amplifier 31 is operated using the first reference voltage Vr1 as the reference. Then, the charge signal Qi which is input is integrated and converted into a voltage, and thus the output signal Vout1 similar to a variation in the pressure is output from the output terminal of the operational amplifier 31. In other words, when the charge signal Qi is transferred to the negative side, the potential of the output terminal of the operational amplifier 31 increases, and thus a charging current I1 (see FIG. 3) flows through the charge capacitor C2, with the result that the output signal Vout1 is changed according to an ascending curve in the figure. On the other hand, when the charge signal Qi is transferred to the positive side, the potential of the output terminal of the operational amplifier 31 is decreased, and thus a discharge current I2 (see FIG. 3) flows through the charge capacitor C2, with the result that the output signal Vout1 is changed according to a descending curve in the figure.

Consequently, since the operational amplifier 31 is operated as the integrator circuit and integrates and outputs the charge signal Qi with a differentiated waveform, the output signal Vout1 has a waveform similar to the variation in the combustion pressure P (see FIG. 4(a)) received by the piezoelectric element 21, with the result that the variation in the combustion pressure P can be output as a voltage. Then, since the operational amplifier 31 is operated so as to cancel out the two noise components Ni and N1 input to the inverting input terminal and the non-inverting input terminal as described previously, the output signal Vout1 is, as shown in the figure, output as the signal containing no noise component. Furthermore, since the peak noise components Nip and N1p are instantaneously large noise components, it is likely that it is impossible to cancel them out completely. Although there is a possibility that a small amount thereof is contained as a noise component Vn1 in the output signal Vout1 as shown in the figure, since it is much smaller than the signal level, there is almost no problem.

FIG. 5(b) shows an example of the voltage waveform of the output signal Vout2 obtained from the output terminal of the operational amplifier 32 in the processing circuit 30. In this case, the operational amplifier 32 is operated as a non-inverting amplifier circuit using the second reference voltage Vr2 as the operation reference, the output signal Vout2 is in phase with the output signal Vout01 and the amplitude thereof has a magnitude which is obtained by amplifying the output signal Vout1 at a predetermined amplification factor. When power supply voltage Vdd=5V, the amplification factor of the operational amplifier 32 is preferably adjusted such that the amplitude of the output signal Vout2 is equal to or less than 5V. Since the output signal Vout1 which is the input of the operational amplifier 32 contains almost no noise component as described previously, the amplified output signal Vout2 likewise contains almost no noise component. Consequently, it is possible to obtain an output signal which has a satisfactory S/N ratio. As described previously, the output signal Vout1 which is input by the operational amplifier 32 may contain a small amount of noise component Vn1. In this case, although the noise component Vn1 is amplified, and as shown in the figure, it is contained in the output signal Vout2 as a noise component Vn2, since it is much smaller than the signal level, there is almost no problem.

Since the pressure detection device 10 according to the first embodiment is operated on the input side of the integrator circuit so as to cancel out the noise component as described above, the charge signal Qi serving as the detection signal can be integrated with few errors and without being affected by the noise component, with the result that it is possible to realize highly accurate pressure detection. Even when the noise entering the pressure detection device 10 changes or an instantaneously large peak noise enters due to factors such as a variation in the number of revolutions of the engine 1, since the changed noise component is simultaneously input to the inverting input terminal and the non-inverting input terminal of the operational amplifier 31, the change in the noise is captured in real time, with the result that it is possible to dynamically cancel out the noise component. Consequently, no matter what state the engine 1 is in, it is possible to constantly obtain an output signal which has a small amount of noise component. Moreover, since the stable second reference voltage Vr2 from the reference power supply 34 formed with the regulator is used as the operation reference for the amplifier circuit of the operational amplifier 32, even if the power supply voltage Vdd is changed by some factor, the second reference voltage Vr2 does not change. In this way, the operational amplifier 32 is stably operated, and thus it is possible to obtain a highly accurate output signal with a small variation in the voltage level. Moreover, since it is possible to perform noise removal without the use of a digital device such as a computer, it is possible to provide a small and lightweight pressure detection device which is excellent in cost and maintenance.

Figure 6:
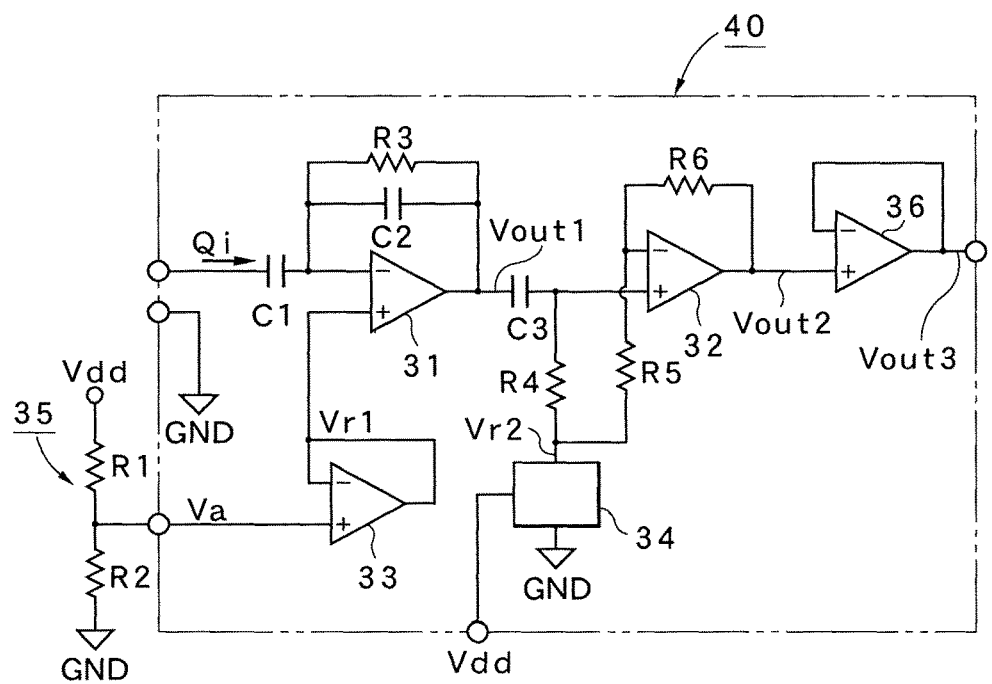
FIG. 6 is a circuit diagram showing a variation of the pressure detection device according to the first embodiment of the present invention.

FIG. 6 shows a variation of the pressure detection device 10 according to the first embodiment, in particular, a processing circuit 40 which is a variation of the processing circuit 30.

The processing circuit 40 is the variation is obtained by adding a voltage follower circuit to the final stage such that the output signal has a low-output impedance, and the voltage follower circuit is formed with an operational amplifier 36. Since the integrator circuit formed with the operational amplifier 31, the amplifier circuit formed with the operational amplifier 32 and the first reference power supply and the second reference power supply 34 formed with the external two voltage dividing resistors R1 and R2 and the operational amplifier 33 except the operational amplifier 36 have the same circuit configuration as in FIG. 3, the same portions are identified with the same numbers, and thus a detailed description thereof will be omitted. Since the detection portion 20 and the conductive portion 11 are the same as those in FIG. 3, they are not illustrated.

In FIG. 6, the output signal Vout2 which is the output of the operational amplifier 32 is fed to the non-inverting input terminal of the operational amplifier 36. In this way, an output signal Vout3 is output from the output terminal of the operational amplifier 36, and the output is an output which is fed from the processing circuit 40 to the outside. The inverting input terminal is directly connected to the output terminal. Hence, the operational amplifier 36 is operated as the voltage follower circuit, and the output of the operational amplifier 32, that is, the output signal Vout2, is output as the output signal Vout3 which is converted so as to have a low-output impedance. As described above, in the variation shown in FIG. 6, in the stage subsequent to the integrator circuit, the two amplifier circuits are provided. In the stage subsequent to the operational amplifier 36, a low-pass filter circuit may be provided, and the output signal Vout3 may be output after the removal of a high-frequency noise component. The output signal Vout3 differs from the output signal Vout2 only in the output impedance, the voltage waveform thereof is the same as that in FIG. 5(b) and thus the output signal Vout3 is not illustrated.

As described above, in the processing circuit 40 shown in FIG. 6 and according to the variation, the voltage follower circuit is added to the final stage, and thus it is possible to convert the output impedance of the output signal Vout3 into an extremely low value. Consequently, it is possible to obtain the same effects as in the processing circuit 30 of FIG. 3, and it is also possible to avoid a failure in which external noise or the like is placed on the output signal Vout3, with the result that it is possible to realize a highly accurate pressure detection device which is excellent in noise resistance.

Second Embodiment

Figure 7:
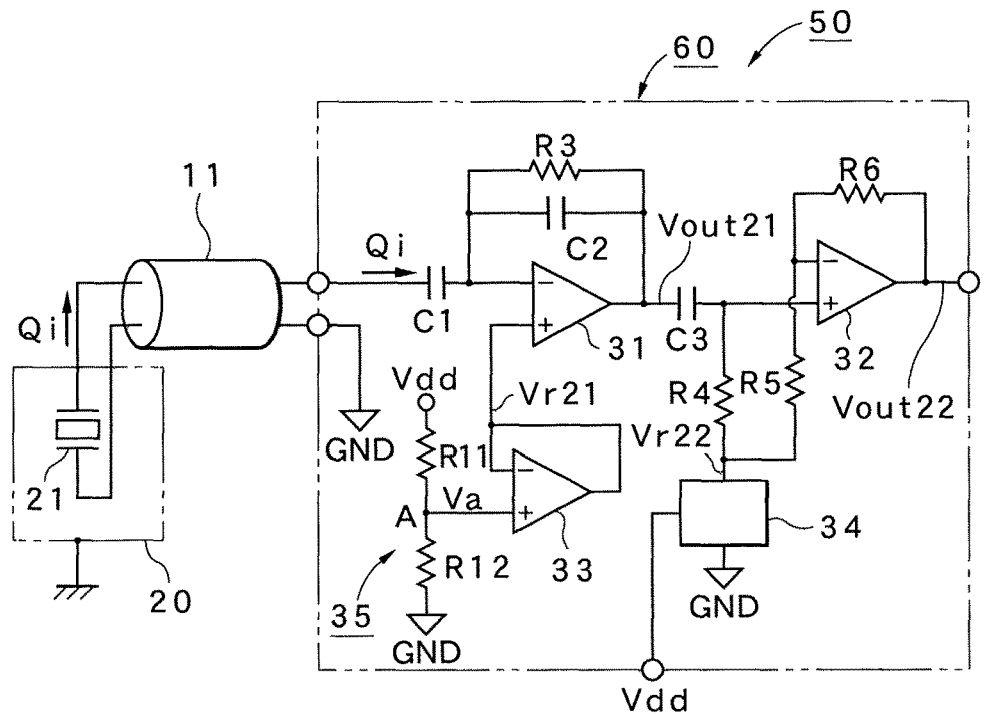
FIG. 7 is a circuit diagram of a pressure detection device according to the second embodiment of the present invention.

A pressure detection device 50 according to a second embodiment will then be described with reference to FIG. 7. The pressure detection device 50 shown in FIG. 7 includes the detection portion 20 and a processing portion 60 as in the first embodiment shown in FIG. 3. Since the detection portion 20 is the same as that in the first embodiment shown in FIG. 3, the same portions are identified with the same numbers, and thus a detailed description thereof will be omitted. Since the illustrated processing portion 60 is formed with a one-chip integrated circuit, and the basic configuration thereof is the same as that of the processing circuit 30 in the first embodiment shown in FIG. 3, the same portions except some components are identified with the same numbers, and thus a detailed description thereof will be omitted. The processing portion 60 includes, as in the first embodiment, the three operational amplifiers 31, 32 and 33 which are operated with a single power supply and the second reference power supply 34 formed with the regulator. Furthermore, the integrator circuit is formed with the operational amplifier 31, and the amplifier circuit is formed with the operational amplifier 32.

On the other hand, the first reference power supply is formed with the operational amplifier 33 and the voltage dividing resistor system formed with the voltage dividing resistor circuit. In this case, two voltage dividing resistors R11 and R12 serving as the voltage dividing resistor circuit forming the first reference power supply are incorporated in the processing circuit 60 which is an integrated circuit as shown in the figure. Specifically, one terminal of the voltage dividing resistor R11 incorporated in the integrated circuit is connected to the power supply voltage Vdd, the other terminal is connected to one terminal of the voltage dividing resistor R12 incorporated in the integrated circuit and the other terminal of the voltage dividing resistor R12 is connected to the GND of the circuit. The connection point A of the voltage dividing resistors R11 and R12 is input to the non-inverting input terminal of the operational amplifier 33. In this way, the power supply voltage Vdd is divided by the voltage dividing resistors R11 and R12 incorporated in the integrated circuit, and the connection point A outputs the divided voltage Va obtained by dividing the power supply voltage Vdd and inputs it to the non-inverting input terminal of the operational amplifier 33. As in the first embodiment, the operational amplifier 33 is operated as the voltage follower circuit, and outputs a first reference voltage Vr21 from the output terminal. As in the first embodiment, the voltage value of the first reference voltage Vr21 is determined by the ratio between the resistance values of the voltage dividing resistors R11 and R12, and the illustrated first reference voltage Vr21 is DC 1.0V.

In the second embodiment, the voltage dividing resistors R11 and R12 serving as the voltage dividing resistor circuit are incorporated in the processing portion 60 formed as the integrated circuit, that is, arranged within the integrated circuit. The second embodiment differs in this point from the first embodiment in which the voltage dividing resistor circuit is arranged outside the integrated circuit. As described above, the processing circuit 30 in which at least part thereof is formed with the integrate circuit is provided, and thus the voltage transformation circuit 35 can be not only arranged outside the integrated circuit as in the first embodiment but also incorporated in the integrated circuit. Since the noise reduction effect can be acquired whichever state the processing circuit 30 is in, even in a limited arrangement space, the design flexibility on the assembly can be enhanced. In particular, since the number of components can be reduced in the case where the integrated circuit is incorporated, it is possible to enhance the reliability of the pressure detection device. Variations in the ratio between the resistance values of the internal resistors are reduced, and thus it is possible to reduce variations in the voltage value of the first reference voltage Vr21. The pressure detection device 50 according to the second embodiment can also be fitted to the engine 1 as with the pressure detection device 10 of the first embodiment.

The pressure detection device 50 having such a circuit configuration and according to the second embodiment uses the first reference voltage Vr21 as the operation reference integrates, with the integrator circuit of the operational amplifier 31, the charge signal Qi which is input and outputs an output signal Vout21. The pressure detection device 50 also amplifies, with the amplifier circuit of the operational amplifier 32, an output signal Vout22 using a second reference voltage Vr22 as the operation reference at a predetermined amplification factor, and outputs the output signal Vout22. As with the first reference voltage Vr1 of the first embodiment, the first reference voltage Vr21 which is the output of the operational amplifier 33 contains the noise component N1 such as the radiation noise and the electromagnetic induction noise produced from the engine 1 shown in FIG. 1 described previously (see FIG. 4(c)). Hence, the noise component Ni contained in the charge signal Qi input to the inverting input terminal of the operational amplifier 31 and the noise component N1 contained in the first reference voltage Vr21 are cancelled out, and thus it is possible to obtain the output signal Vout21 containing almost no noise component.

Consequently, as with the pressure detection device 10 of the first embodiment described previously, the pressure detection device 50 of the second embodiment can obtain the output signal in which the influence of the noise is reduced and realize highly accurate pressure detection. Furthermore, in the second embodiment, as in the variation of the first embodiment described previously, the configuration can be included in which the voltage follower circuit is added to the final stage of the amplifier circuit to convert the output impedance into an extremely low value. In this way, it is possible to realize a highly accurate pressure detection device which is excellent in noise resistance.

Third Embodiment

Figure 8:
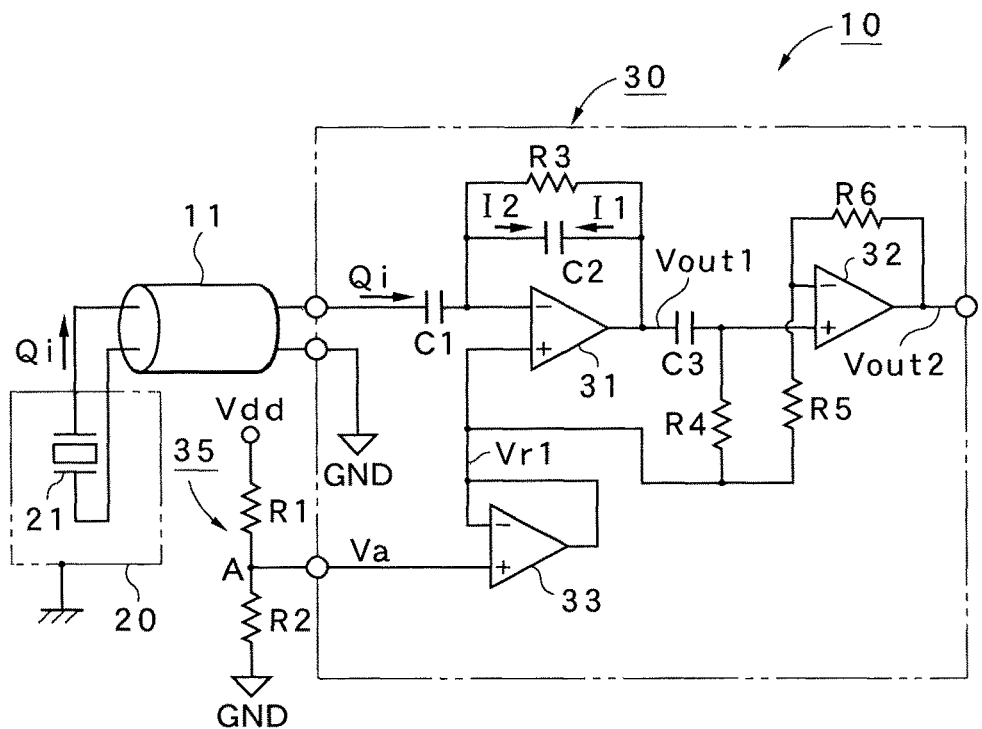
FIG. 8 is a circuit diagram showing a variation of the pressure detection device according to a third embodiment of the present invention.

A pressure detection device 70 according to a third embodiment will then be described with reference to FIG. 8. The pressure detection device 70 shown in FIG. 8 includes the detection portion 20 and a processing portion 80 as in the first embodiment shown in FIG. 3. In FIG. 8, the pressure detection device 70 of the third embodiment includes the detection portion 20 and the processing portion 80 as in the first embodiment. Since the detection portion 20 is the same as that in the first embodiment, the same portions are identified with the same numbers, and thus a detailed description thereof will be omitted. In the configuration of the processing portion 80, the same components as those in the processing circuit 30 of the first embodiment (see FIG. 3) are identified with the same numbers, and thus a detailed description thereof will be omitted.

In this case, the processing portion 80 includes, as in the first embodiment, the three operational amplifiers 31, 32 and 33 which are operated with a single power supply. The integrator circuit is formed with the operational amplifier 31, the amplifier circuit is formed with the operational amplifier 32 and the first reference power supply is formed with the operational amplifier 33 and the voltage dividing resistor system formed with the voltage dividing resistor circuit. The third embodiment differs from the first embodiment in that the second reference power supply 34 formed with the regulator (see FIG. 3) is not provided and that the operational amplifiers 31, 32 and 33 are operated with one reference power supply in the voltage dividing resistor system. In this embodiment, the non-inverting input terminal of the non-inverting input of the operational amplifier 32 is connected through the resistor R4 from the first reference power supply to the reference voltage Vr1, and the reference voltage Vr1 from the first reference power supply is connected through the resistor R5 to the inverting input terminal. In such a configuration, although the influence of the noise is easily received because the reference voltage Vr1 containing the noise component is input as compared with the first embodiment in which the reference voltage Vr2 containing almost no noise component is input to the operational amplifier 32, it is possible to use only one reference power supply, with the result that it is possible to reduce the size of the circuit. With respect to the influence of the noise, since the output signal Vout1 of the operational amplifier 31 contains almost no noise component, as compared with the conventional technology, a pressure detection device with a low noise influence is realized.

Although the preferred embodiment (and the variation of the embodiment) are described in detail above, the present invention is not limited to such an embodiment, and modifications, additions and deletions can be arbitrarily performed on the detailed configurations, the shapes, the materials, the numbers, the methods and the like without departing from the spirit of the present invention.

For example, although a case where the voltage transformation circuit 35 is formed with the voltage dividing resistor circuit obtained by combining a plurality of voltage dividing resistors R1 and R2 is illustrated, a configuration using any other circuit may be adopted as long as the circuit has the function of only transforming the power supply voltage Vdd fed from an external power supply to obtain the first reference voltage Vr1 with a predetermined voltage value. There are no limitations on the illustrated circuits such as the integrator circuit 31 and the circuit for obtaining the second reference voltage Vr2, and they can be replaced with other circuits and the like which have similar functions. Furthermore, whether or not the voltage follower circuit in the final stage of the processing circuit 30 is provided may be arbitrarily determined.

INDUSTRIAL APPLICABILITY

The pressure detection device according to the present invention can be widely utilized for not only the detection of the combustion pressure of an engine but also pressure detection in various other applications.

The invention claimed is:

1. A pressure detection device comprising:
   a pressure detection element which receives pressure so as to output a detection signal corresponding to the pressure; and
   a processing circuit which processes and outputs the detection signal output from the pressure detection element,
   wherein the processing circuit includes:
      a voltage transformation circuit receiving a power supply voltage fed from an external power supply and transforming the power supply voltage fed to obtain a first reference voltage with a predetermined positive voltage value;
      an integrator circuit operating with the power supply voltage fed from the external power supply, receiving the first reference voltage as an operation reference and the detection signal from the pressure detection element to perform integral processing on the detection signal so as to convert the detection signal into a single output signal, differentially amplifying the detection signal and the first reference voltage, the integrator circuit having a computation amplifier circuit and integrating a detection signal to convert the detection signal to a voltage waveform; and
      at least one or more amplifier circuits receiving the single output signal of the integrator circuit and a second reference voltage with a predetermined voltage value as an operation reference to perform amplification processing on the single output signal of the integrator circuit,
   wherein the integrator circuit cancels out a noise component superimposed on the detection signal by differentially amplifying the detection signal and the first reference voltage,
   wherein the voltage transformation circuit is formed with a voltage dividing resistor circuit in which a plurality of voltage dividing resistors are combined,
   wherein the second reference voltage is obtained from an output of a second reference power supply using a regulator, and
   wherein the detection signal is a charge signal which is obtained from a piezoelectric element used as the pressure detection element.

2. The pressure detection device according to claim 1, wherein the integrator circuit is operated with a single power supply.

3. The pressure detection device according to claim 1, wherein the second reference voltage is obtained from the voltage transformation circuit.

4. The pressure detection device according to claim 1, wherein the processing circuit includes a voltage follower circuit in the final stage.

5. The pressure detection device according to claim 1, wherein at least part of the processing circuit is formed with an integrated circuit, and the voltage transformation circuit is arranged outside the integrated circuit.

6. The pressure detection device according to claim 1, wherein at least a part of the processing circuit is formed with an integrated circuit, and the voltage transformation circuit is incorporated in the integrator circuit.

7. The pressure detection device according to claim 1, wherein the pressure detection device is applied to a pressure detection device which detects a combustion pressure of an engine mounted in an automobile.

8. The pressure detection device according to claim 1, wherein the integrator circuit receives the first reference voltage as an operation reference to a first input and the detection signal from the pressure detection element to a second input, and
   wherein the at least one amplifier circuit comprises a first amplifier circuit receiving the single output signal of the integrator circuit to a first input and the second reference voltage with a predetermined voltage value as an operation reference to a second input to perform amplification processing on the single output signal of the integrator circuit to obtain a second output voltage.

* * * * *